US011747153B1

(12) United States Patent
Gunnarsson et al.

(10) Patent No.: US 11,747,153 B1
(45) Date of Patent: Sep. 5, 2023

(54) APPARATUS AND ASSOCIATED METHOD FOR DETERMINING A TRAVEL ITINERARY

(71) Applicant: Travelshift ehf., Reykjavik (IS)

(72) Inventors: Eidur Sveinn Gunnarsson, Reykjavik (IS); Gudmundur Magnússon, Reykjavik (IS); Karl Þorláksson, Reykjavik (IS); Kristmundur Ágúst Jónsson, Kópavogur (IS); Saga Úlfarsdóttir, Reykjavik (IS); Ingólfur Shahin, Reykjavik (IS); Yurii Serhiichuk, Kharkov (UA)

( * ) Notice: Subject to any disclaimer, the term of this patent is extended or adjusted under 35 U.S.C. 154(b) by 0 days.

(21) Appl. No.: 17/870,033

(22) Filed: Jul. 21, 2022

(51) Int. Cl.
*G01C 21/34* (2006.01)
*G06F 3/0482* (2013.01)
*G01C 21/36* (2006.01)

(52) U.S. Cl.
CPC ....... *G01C 21/343* (2013.01); *G01C 21/3446* (2013.01); *G01C 21/3453* (2013.01); *G01C 21/3679* (2013.01); *G06F 3/0482* (2013.01)

(58) Field of Classification Search
CPC .............. G01C 21/343; G01C 21/3446; G01C 21/3453; G01C 21/3679; G06F 3/0482
See application file for complete search history.

(56) References Cited

U.S. PATENT DOCUMENTS

| | | | |
|---|---|---|---|
| 5,712,788 A | 1/1998 | Liaw et al. | |
| 6,009,403 A * | 12/1999 | Sato | G09B 29/106 |
| | | | 701/454 |
| 6,904,421 B2 | 6/2005 | Shetty | |
| 9,631,939 B2 * | 4/2017 | Brenner | G01C 21/343 |
| 2002/0173978 A1 | 11/2002 | Boies et al. | |
| 2008/0046298 A1 | 2/2008 | Ben-Yehuda et al. | |
| 2010/0262359 A1 | 10/2010 | Motoyama | |
| 2010/0305984 A1 | 12/2010 | Ben-Yitschak et al. | |

(Continued)

FOREIGN PATENT DOCUMENTS

| | | |
|---|---|---|
| AU | 2018206818 A1 | 2/2020 |
| CN | 104504198 A | 4/2015 |

(Continued)

OTHER PUBLICATIONS

Extended European Search Report, European Patent No. 22186077. 8, dated Dec. 15, 2022, 8 pages.

*Primary Examiner* — Rami Khatib
(74) *Attorney, Agent, or Firm* — Fennemore Craig, P.C.

(57) ABSTRACT

A method of determining a travel itinerary comprising: receiving: a start location; an end location; a start time; and an end time, a difference between the start and end times defining a fixed duration; and selecting a plurality of intermediate points of interest, POIs, as a subset of a plurality of candidate POIs to define the travel itinerary between the start and end locations, wherein selecting the plurality of intermediate POIs comprises: selecting a plurality of intermediate regions from a plurality of candidate regions based on the fixed duration, a regional value associated with each candidate region and regional travel costs associated with each candidate region; and selecting the plurality of intermediate POIs based on the selection of intermediate regions, a POI value associated with each candidate POI within the selection of intermediate regions and POI travel costs associated with each POI.

19 Claims, 5 Drawing Sheets

(56) References Cited

U.S. PATENT DOCUMENTS

| | | |
|---|---|---|
| 2011/0145025 A1 | 6/2011 | Jiang et al. |
| 2012/0130638 A1* | 5/2012 | Uyama ............ G08G 1/096811 |
| | | 701/533 |
| 2013/0166204 A1 | 6/2013 | Davies et al. |
| 2013/0317884 A1 | 11/2013 | Chidolvskii |
| 2015/0134247 A1* | 5/2015 | Kobuya ................ G01C 21/36 |
| | | 701/533 |
| 2015/0294239 A1 | 10/2015 | Araya Hernandez et al. |
| 2016/0117616 A1 | 4/2016 | Wang et al. |
| 2016/0117618 A1 | 4/2016 | Wang et al. |
| 2016/0202076 A1* | 7/2016 | Feng .................... G01C 21/343 |
| | | 701/400 |
| 2016/0203422 A1 | 7/2016 | Demarchi et al. |
| 2017/0227367 A1 | 8/2017 | Thangaraj et al. |
| 2017/0344913 A1 | 11/2017 | Vaidya et al. |
| 2018/0285784 A1* | 10/2018 | Kashyap .............. G06Q 10/025 |
| 2019/0122315 A1 | 4/2019 | Valverde, Jr. et al. |
| 2019/0228351 A1 | 7/2019 | Simpson et al. |
| 2020/0050997 A1 | 2/2020 | Fox et al. |
| 2020/0160732 A1 | 5/2020 | Nakadai et al. |
| 2020/0173789 A1* | 6/2020 | Kelleher .............. G06Q 10/047 |
| 2020/0320446 A1 | 10/2020 | Dahl et al. |

FOREIGN PATENT DOCUMENTS

| | | |
|---|---|---|
| CN | 111121796 A | 5/2020 |
| CN | 113806900 A | 12/2021 |
| EP | 1145170 | 1/2000 |
| EP | 1105696 A1 | 6/2001 |
| EP | 1222578 | 12/2001 |
| EP | 1494193 A2 | 1/2005 |
| EP | 1690161 | 6/2005 |
| EP | 1669719 A1 | 6/2006 |
| EP | 2217880 | 5/2009 |
| EP | 2691740 | 10/2012 |
| EP | 2811450 A1 | 12/2014 |
| EP | 2930673 A1 | 10/2015 |
| EP | 3140803 | 11/2015 |
| EP | 3046058 A1 | 7/2016 |
| EP | 3452786 | 11/2017 |
| EP | 3482383 | 1/2018 |
| EP | 3333780 A1 | 6/2018 |
| EP | 3791135 | 11/2019 |
| EP | 3683742 A1 | 7/2020 |
| FR | 3105522 A3 | 6/2021 |
| GB | 2544992 A | 6/2017 |
| JP | 2012215401 A | 11/2012 |
| KR | 102008478 B1 | 8/2019 |
| RU | 2723237 C1 | 6/2020 |
| WO | 1999/01822 A1 | 1/1999 |
| WO | 2008/073802 A2 | 6/2008 |
| WO | 2010/077552 A1 | 7/2010 |
| WO | 2012/092519 A1 | 7/2012 |
| WO | 2013/088811 A1 | 6/2013 |
| WO | 2016/003984 A1 | 1/2016 |
| WO | 2020/041145 A1 | 2/2020 |
| WO | 2020131925 A2 | 6/2020 |
| WO | 2020/142706 A1 | 7/2020 |
| WO | 2020/168014 A1 | 8/2020 |
| WO | 2020/190983 A1 | 9/2020 |
| WO | 2020/191024 A1 | 9/2020 |
| WO | 2020/263176 A1 | 12/2020 |

\* cited by examiner

APPARATUS AND ASSOCIATED METHOD FOR DETERMINING A TRAVEL ITINERARY

Field

The present disclosure relates to travel itinerary planning, and more particularly to an apparatus and associated method for determining a travel itinerary.

Background

Determining a travel itinerary or a route plan for a travelling entity, such as a vehicle or a user, can be a complex process when there are a large number of potential routes and/or potential points of interest (POIs). The present disclosure may provide improvements for determining a travel itinerary or route plan.

Summary

According to a first aspect of the present disclosure there is provided a computer-implemented method of determining a travel itinerary comprising:
receiving:
  a start location;
  an end location;
  a start time for starting a journey from the start location; and
  an end time for ending the journey at the end location, a difference between the start time and the end time defining a fixed duration; and
selecting a plurality of intermediate points of interest, POIs, as a subset of a plurality of candidate POIs to define the travel itinerary between the start location and the end location, wherein selecting the plurality of intermediate POIs comprises:
  selecting a plurality of intermediate regions from a plurality of candidate regions, each candidate region comprising a subset of the plurality of candidate POIs, to define a regional route from the start location to the end location, based on the fixed duration, a regional value associated with each candidate region and regional travel costs associated with each candidate region; and
  selecting the plurality of intermediate POIs based on the selection of intermediate regions, a POI value associated with each candidate POI within the selection of intermediate regions and POI travel costs associated with each POI.

The travel itinerary may be a prioritised travel itinerary.

The computer-implemented method may further comprise outputting the travel itinerary as an ordered route from the start location to the end location via the plurality of intermediate POIs.

The computer-implemented method may further comprise:
receiving a plurality of candidate hubs; and
selecting a plurality of intermediate regions from a plurality of candidate regions and selecting a plurality of intermediate hubs from the plurality of candidate hubs to define the regional route, based on the fixed duration, the regional value associated with each candidate region, the regional travel costs associated with each candidate region and hub travel costs associated with each candidate hub.

Each candidate hub may comprise a rest point, accommodation and/or a refueling point for a travelling entity.

The regional travel costs for each candidate region may comprise travel costs associated with travelling to or from the candidate region, respectively from or to:
  one or more other candidate regions;
  the start location or the end location; and/or
  one or more candidate hubs.

The POI travel costs for each candidate POI may comprise travel costs associated with travelling to or from the POI, respectively from or to:
  one or more other candidate POIs;
  the start location or the end location; and/or
  one or more candidate hubs.

The hub travel costs for each candidate hub may comprise travel costs associated with travelling to or from the hub, respectively from or to:
  one or more candidate regions; and/or
  the start location or the end location.

The regional route may comprise the plurality of intermediate hubs with one or more regions between successive intermediate hubs.

The computer-implemented method may further comprise:
  determining a plurality of journey segments based on the fixed duration; and
  defining a template structure of the regional route to include:
    an intermediate hub between each journey segment; and
    one or more intermediate regions within each journey segment.

Selecting the plurality of intermediate regions from the plurality of candidate regions may comprise:
  adjusting a selection of the plurality of intermediate regions until a value of a regional objective function, operating on the regional value and the regional travel costs, satisfies a termination condition.

Selecting the plurality of intermediate regions from the plurality of candidate regions and selecting a plurality of intermediate hubs from the plurality of candidate hubs may comprise:
  adjusting a selection of the plurality of intermediate regions and adjusting a selection of the plurality of the intermediate hubs until a value of a regional objective function, operating on the regional value, the regional travel costs and the hub travel costs, satisfies a termination condition.

Adjusting the selection of the plurality of intermediate regions may be performed by a genetic algorithm and the regional objective function may be a fitness function.

Selecting the plurality of intermediate POIs may comprise:
  adjusting a selection of the intermediate POIs from POIs of the selected intermediate regions until a value of a POI objective function, operating on the POI value and the POI travel costs, satisfies a termination condition.

The POI objective function may operate on a cumulative POI value.

The POI objective function may operate on a travel cost threshold.

The computer-implemented method may further comprise determining a plurality of journey segments based on the fixed duration. Selecting the plurality of intermediate POIs may comprise, for each journey segment:
  adjusting a selection of the intermediate POIs from POIs of selected intermediate regions of the journey segment until a value of a segment objective function, operating on the POI value and the POI travel costs, satisfies a termination condition.

The segment objective function may operate on a cumulative POI value.

The segment objective function may operate on a segment travel cost threshold.

Adjusting the selection of the intermediate POIs may be performed by an ant colony optimization algorithm.

The regional value associated with each candidate region may be based on POI values of candidate POIs in the candidate region.

The regional value may be based on:
a sum of the POI values;
an average of the POI values;
a sum of an integer number of the highest POI values; and/or
an average of an integer number of the highest POI values.

The computer-implemented method may further comprise:
receiving user feedback on the one or more selected intermediate POIs of the travel itinerary; and updating the POI values of the one or more selected intermediate POIs based on the user feedback.

The computer-implemented method may further comprise:
receiving, selecting or determining the plurality of candidate POIs based on the start location, the end location and/or the fixed duration.

Receiving, selecting or determining the plurality of candidate POIs may comprise receiving or selecting the candidate POIs from a library.

Receiving, selecting or determining the plurality of candidate POIs may comprise receiving, or selecting a plurality of candidate regions and receiving the plurality of candidate POIs as data associated with the candidate regions.

The computer-implemented method may further comprise defining the plurality of candidate regions by partitioning the plurality of candidate POIs into the plurality of candidate regions based on a spatial density of the plurality of candidate POIs.

According to a second aspect of the present disclosure these is provided an apparatus for determining a travel itinerary, the apparatus comprising:
at least one processor; and
at least one memory including computer program code, the at least one memory and computer program code configured to, with the at least one processor, cause the apparatus to:
receive:
a start location;
an end location;
a start time for starting a journey from the start location; and
an end time for ending the journey at the end location, a difference between the start time and the end time defining a fixed duration; and
select a plurality of intermediate points of interest, POIs, as a subset of a plurality of candidate POIs to define the travel itinerary between the start location and the end location, wherein selecting the plurality of intermediate POIs comprises:
selecting a plurality of intermediate regions from a plurality of candidate regions, each candidate region comprising a subset of the plurality of candidate POIs, to define a regional route from the start location to the end location, based on the fixed duration, a regional value associated with each candidate region and regional travel costs associated with each candidate region; and
selecting the plurality of intermediate POIs based on the selection of intermediate regions, a POI value associated with each candidate POI within the selection of intermediate regions and POI travel costs associated with each POI.

According to a third aspect of the present disclosure there is provided a computer implemented method of determining a travel itinerary comprising:
receiving, from a user input:
a start location;
an end location;
a start time for starting a journey from the start location; and
an end time for ending the journey at the end location, a difference between the start time and the end time defining a fixed duration;
selecting, using a controller, a plurality of intermediate points of interest, POIs, as a subset of a plurality of candidate POIs to define the travel itinerary between the start location and the end location, wherein selecting the plurality of intermediate POIs comprises:
selecting, using a regional routing module, a plurality of intermediate regions from a plurality of candidate regions, each candidate region comprising a subset of the plurality of candidate POIs, to define a regional route from the start location to the end location, based on the fixed duration, a regional value associated with each candidate region and regional travel costs associated with each candidate region; and
selecting, using a local routing module, the plurality of intermediate POIs based on the selection of intermediate regions, a POI value associated with each candidate POI within the selection of intermediate regions and POI travel costs associated with each POI; and
outputting, to a user interface, the travel itinerary as an ordered route from the start location to the end location via the plurality of intermediate POIs.

According to a fourth aspect of the present disclosure there is provided an apparatus for determining a travel itinerary, the apparatus comprising:
at least one processor; and
at least one memory including computer program code, the at least one memory and computer program code configured to, with the at least one processor, cause the apparatus to:
receive:
a start location;
an end location;
a start time for starting a journey from the start location; and
an end time for ending the journey at the end location, a difference between the start time and the end time defining a fixed duration;
select a plurality of intermediate points of interest, POIs, as a subset of a plurality of candidate POIs to define the travel itinerary between the start location and the end location, wherein selecting the plurality of intermediate POIs comprises:
selecting a plurality of intermediate regions from a plurality of candidate regions, each candidate region comprising a subset of the plurality of candidate POIs, to define a regional route from the start location to the end location, based on the fixed duration, a regional value associated with each candidate region and regional travel costs associated with each candidate region; and selecting the plurality of intermediate POIs based on the selection of intermediate regions, a POI value associated with each candidate POI within the selection of intermediate regions and POI travel costs associated with each POI; and output the travel itinerary as an ordered route from the start location to the end location via the plurality of intermediate POIs.

According to a fifth aspect of the present disclosure there is provided a computer program comprising computer code configured to perform any method disclosed herein.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION

Determining a travel itinerary or a route plan for a travelling entity, such as a vehicle or a user, can be a complex process when there are a large number of potential routes and/or potential points of interest (POIs). Such route planning or itinerary planning may be applicable in a range of navigation applications such as delivery/pick-up logistics, emergency vehicle response planning and travel planning. Existing methods and systems for determining a travel itinerary can have a limited capacity for the number of POIs they can process in a given time period without requiring excessive processing resources. Therefore, it is desirable to improve the speed and efficiency of itinerary planning, particularly where applications demand fast or even on-the-fly results such as in logistics planning, disaster response or the provision of web-based services in which a user expects relatively instantaneous results. It may also be desirable to provide prioritisation of destinations in applications in which the capacity of the travelling entity is less than the total number of potential POIs. The present disclosure may provide one or more of these desired improvements when determining travel itineraries.

Figure 1:
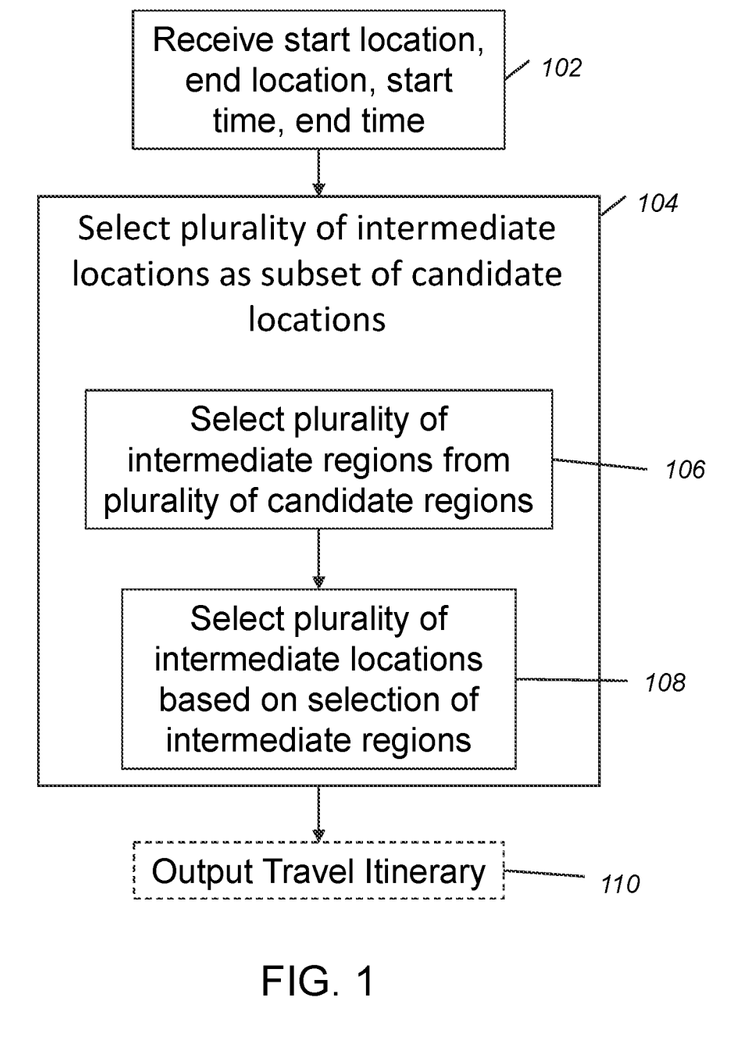
FIG. 1 illustrates a method of determining a travel itinerary according to an embodiment of the present disclosure.

FIG. 1 illustrates a method of determining a travel itinerary according to an embodiment of the present disclosure.

A first step 102 of the method comprises receiving: a start location, an end location, a start time for starting a journey from the start location, and an end time for ending the journey at the end location. A difference between the start time and the end time defines a fixed duration of the journey.

A second step 104 of the method comprises selecting a plurality of intermediate points of interest (POIs) as a subset of a plurality of candidate POIs to define the travel itinerary between the start location and the end location. The second step of the method is provided by two sub-steps.

A first sub-step 106 comprises selecting a plurality of intermediate regions from a plurality of candidate regions, each candidate region comprising a subset of the plurality of candidate POIs, to define a regional route from the start location to the end location, based on the fixed duration, a regional value associated with each candidate region and regional travel costs associated with each candidate region.

A second sub-step 108 comprises selecting the plurality of intermediate POIs based on the selection of intermediate regions, a POI value associated with each candidate POI within the selection of intermediate regions and POI travel costs associated with each POI.

By selecting the intermediate POIs using a two-step regional and local process, the method can advantageously process a large number of potential POIs that far exceeds the visiting capacity of the travelling entity and provide a prioritised travel itinerary without requiring excessive time or computational resources. In this way, the method addresses the limited capacity of other methods and systems for determining a travel itinerary.

In this example, the method includes an optional third step 110 of outputting the travel itinerary as an ordered route from the start location to the end location via the plurality of intermediate POIs. The travel itinerary may be output for display on a user device.

Figure 2:
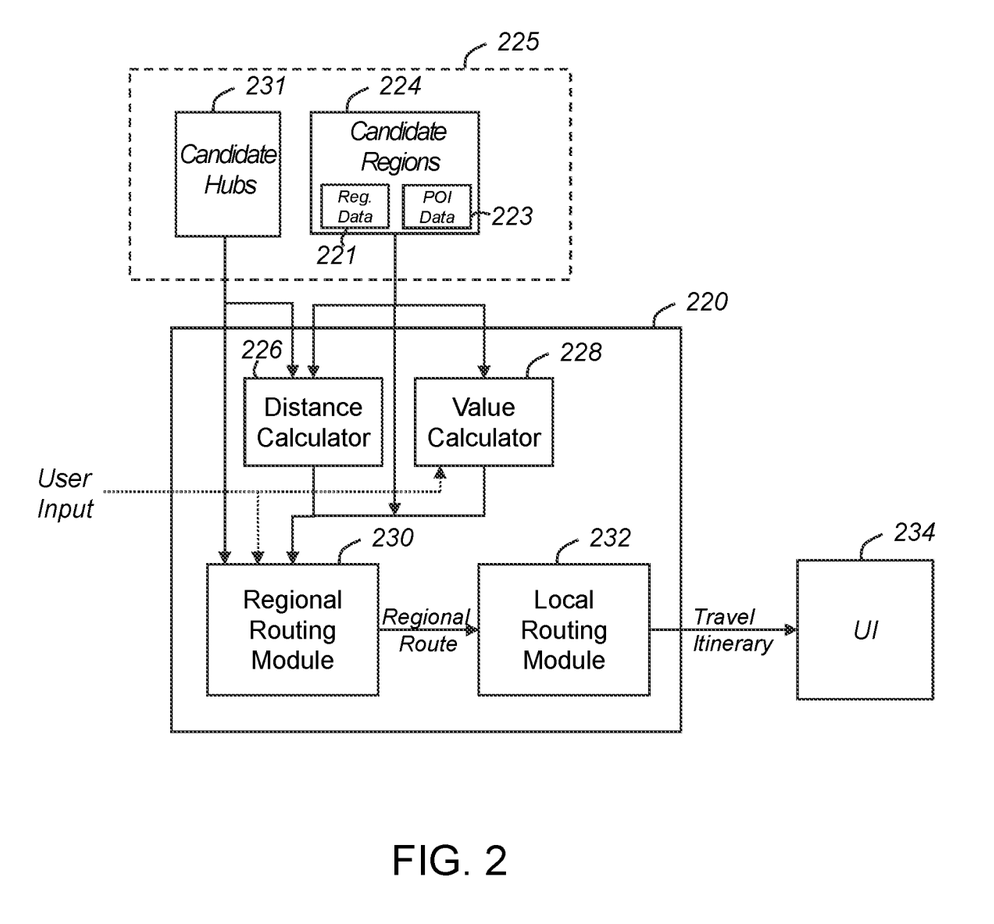
FIG. 2 illustrates a system for determining a travel itinerary according to an embodiment of the present disclosure.

FIG. 2 illustrates a system for determining a travel itinerary according to an embodiment of the present disclosure.

The system comprises a controller 220 configured to receive user input 222. The user input 222 includes the start location, the end location, the start time and the end time. The controller 220 may be located at a server. The controller 220 may receive the user input 222 from a user device (not shown) of an end-user. The user device may communicate with the server over a communication network such as the internet.

The start time and the end time together define a fixed journey duration. The controller 220 may divide the fixed journey duration into a plurality of journey segments. The controller 220 may divide the fixed journey duration into a plurality of journey segments based on the fixed duration. For example, each journey segment may correspond to a time, for example a day for logistics or travel planning. In other examples, each journey segment may correspond to a travelling entity capacity, for example a load capacity or a fuel capacity for emergency vehicle response or logistics planning. The travelling entity may be required to visit a hub between each journey segment. As a result, the controller 220 may define the travel itinerary to include a hub separating each journey segment. The hub may correspond to accommodation/rest stops or refuelling locations for the travelling entity for any of the applications. The hub may also correspond to a depot for a logistics application. The hub may also correspond to a support area, such as a health facility or an evacuation area for emergency vehicle response planning.

The user input 222 may further include one or more user requirements. The one or more user requirements may include one or more travelling entity requirements (relating to the user or vehicle travelling), one or more POI rules and/or one or more hub requirements.

Regional Routing

In this example, the controller 220 receives a plurality of candidate regions 224. The candidate regions 224 may be non-overlapping. The candidate regions 224 each include a subset of the plurality of POIs. In this example, the controller 220 can select the plurality of (predefined) candidate regions 224 from a library 225 based on the start position, the end position and/or the fixed duration. In some examples, the controller 220 may select all candidate regions 224 within a working area (e.g a country or operational area) encompassing the start location and/or the end location. In some examples, the controller may select candidate regions 224 within a range of a path between the start location and the end location, based on the fixed duration. The library 225 may be stored on a local or networked storage medium and the controller 220 may be communicatively coupled thereto. In other examples, the controller 220 may determine the plurality of candidate regions 224 by segmenting raw geographical data that includes the POIs. The controller 220 may segment the raw data based on the start and end locations. The raw geographical data may be stored in the library 225. Segmentation of the raw geographical data is discussed in further detail below. The segmentation may be performed by a second controller (not shown) and the determined candidate regions may be stored as predefined candidate regions 224 in the library 225, accessible by the controller 220.

In this example, the candidate regions 224 may comprise associated regional data 221 and/or POI data 223. The regional data may include one or more of: a regional value associated with each candidate region 224; regional travel costs associated with each candidate region 224; co-ordinates, such as boundary co-ordinates and/or a nodal point (see below) defining the position and geographical extent of each candidate region 224; candidate POIs within each candidate region 224; the POI data 223 of the POIs within each candidate region 224; candidate hubs 241 within each candidate region 224; and map data associated with each candidate region. The POI data 223 may include one or more of: candidate POIs within a geographical area; candidate POIs within each candidate region 224; POI values associated with each candidate POI in each candidate region; POI parameters (e.g. a POI capacity, a POI interaction time, POI opening times, POI load, POI type, POI priority etc) associated with each candidate POI in each candidate region 224; and POI co-ordinates associated with each candidate POI in each candidate region 224. In some examples, the controller may receive some or all of the POI data independently of the candidate regions. As already noted, in some examples, the controller 220 may receive POI data 223 from the library 225 and determine the candidate regions 224 based on segmenting the POI data (see below).

In some examples, the controller 220 may comprise a distance calculator 226 and a value calculator 228. The distance calculator 226 may calculate regional travel costs associated with each candidate region 224. The regional travel costs for each candidate region 224 may comprise travel costs associated with travelling to (or from) the candidate region 224, respectively from or to: (i) one or more other candidate regions 224; (ii) the start location or the end location; and/or (iii) one or more candidate hubs 231. In some examples, a regional travel cost may comprise a distance. In some examples, a travel cost may relate to a travelling time (e.g. driving time or flying time (e.g. for an emergency helicopter)). The travel cost associated with travelling between pairs of candidate regions 224 (or candidate regions and the start/end location or candidate hubs) may be determined with respect to a nodal point of the respective candidate region(s) 224. The nodal point of each candidate region 224 may correspond to any of: a predefined point; a weighted centre of a polygonal shape of the region; and a weighted or non-weighted centroid of the POIs of the candidate region 224. A weighted centroid may be based on POI values of POIs in the candidate region 224.

In some examples, the regional travel costs of each candidate region 224 may further comprise an intra-regional travel cost. The intra-regional travel cost may quantify a spacing of POIs within the candidate region 224. For example, highly dispersed POIs within a candidate region may be quantified with a relatively high intra-regional travel cost, whereas a candidate region with highly concentrated POIs may be quantified with a relatively low intra-regional travel cost.

Although this example includes a distance calculator 226, in other examples the regional travel costs may be pre-calculated and the controller 220 may receive the regional travel costs (and the nodal points) as part of the regional data 221 associated with the candidate regions 224.

In some examples, the controller 220 may generate an undirected cyclic graph in which nodes of the graph denote candidate regions 224 and edges of the graph denote the regional travel cost between the corresponding candidate regions 224. The undirected cyclic graph may provide a representation of the position of regional nodes and distances between nodes. The regional routing algorithm may use the graph to determine whether a candidate region is reachable from another candidate region. In some examples, candidate regions may not be connected by an edge if a distance between them is greater than a regional travel cost threshold. The undirected cyclic graph may further comprise candidate hubs (discussed further below). Candidate hubs may be represented as additional nodes. Candidate hubs may be connected by edges to candidate regions but not to other candidate hubs.

The controller 220 may receive the plurality of candidate POIs as a plurality of subsets of candidate POIs each associated with a corresponding candidate region 224. The candidate POIs may be received as part of the POI data 223 (or regional data 221) of the candidate regions 224 or as part of separate POI data. The content of the POI data can vary depending on the end application and specific examples are described in the "Example Applications" section below. In some examples, the POI data may include a POI value of the respective candidate POI. The POI value may quantify a benefit to the travelling entity of visiting the candidate POI. In some examples, the controller 220 may determine the POI value. For example, the controller 220 may determine the POI value based on the POI data and the one or more user requirements. For example, the controller may scale a raw POI value (or a raw POI rating) or generate a POI value based on the one or more POI rules and/or the one or more travelling entity requirements.

The value calculator 228 may determine a regional value for each candidate region 224. The value calculator 228 may determine the regional value based on a combination of POI values of POIs in the candidate region 224. For example, the regional value may correspond to any of: an average of POI value of all POIs in the candidate region; a maximum POI value in the candidate region; and an average of POI value for a particular number of the highest POI values in the region, for example the highest two POI values, five POI values or ten POI values.

The controller 220 selects the plurality of intermediate regions from the plurality of candidate regions to define a regional route from the start location to the end location. The controller 220 selects the plurality of intermediate locations based on the fixed duration (e.g. the number of journey segments), the regional value associated with each candidate region 224 and the regional travel costs associated with each candidate region 224.

The controller 220 may comprise a regional routing module 230. The regional routing module 230 can receive the candidate regions 224, the regional values and regional travel costs and select the plurality of intermediate regions from the plurality of candidate regions 224 by performing an optimization algorithm. For example, the regional routing module 230 can adjust a selection of the plurality of intermediate regions until a value of an objective function satisfies a termination condition. The termination condition may comprise known objective function termination conditions, such as a value of an objective function crossing a threshold, a value of a gradient of the objective function on successive iterations crossing a threshold, a maximum number of iterations being exceeded etc. The objective function may operate on the regional values and the regional travel costs.

In some examples, the optimization algorithm may comprise a genetic algorithm and the objective function may comprise a fitness function. In other examples, the optimization algorithm may comprise alternative versions of hill climbing algorithms, such as Greedy Hill Climbing, Stochastic Hill Climbing, First-Choice Hill Climbing, Random Restart Hill Climbing, and Simulated Annealing Search. A genetic algorithm has advantageously been shown to provide better optimization performance (best solution in reasonable time) than other algorithms by more efficiently exploring the search space and avoiding getting stuck in local minima.

In this example, the regional routing module 230 uses a genetic algorithm and the fitness function operates on the regional value and the regional travel costs. The fitness function may penalize the fitness function value if a regional travel cost (e.g. a driving time or distance to a specific candidate region), a regional segment travel cost (e.g. a total driving time or distance between regions in a single journey segment) and/or a total regional travel cost (e.g. a total driving time or distance between regions for the whole journey) exceeds a corresponding cost threshold. The cost thresholds may be specified in the one or more user requirements. The cost thresholds may also be based on the distance between the start location and the end location, and the fixed duration. In other words, the total distance to be travelled between the start and end locations in the fixed duration may set minimum values for the total regional travel cost and/or a segment travel cost. The fitness function also operates on the regional values, for example a combined sum of the regional values of selected intermediate regions. The fitness function may apply a decay factor to the regional value if a region is visited more than once. For example, a candidate region may have a very high regional value due to a large number of POIs within the candidate region having high POI values. Therefore, an optimized route may visit the candidate region for more than one journey segment. As a result, a region may be visited more than once in succession. To allow for this, the fitness function may apply a decay factor to the regional value with each successive visit to the same candidate region. In other words, the fitness function may apply a decay factor based on the amount of time spent at a candidate location. To discourage back and forth travel to the same candidate region, the fitness function may also apply a penalty to the regional value if a candidate region is revisited later in a trip (i.e. A→A→B→C would not be penalized but A→B→A→C would be).

In this example, the regional routing module 230 also receives a plurality of candidate hubs 231. As outlined above, the travel itinerary may include visits to a hub between each journey segment. As a result, the regional route can include a selection of intermediate hubs with intervening selected intermediate regions. The regional routing module 230 may receive the candidate hubs 231 as hub POIs as part of the regional data 221 or POI data 223. Alternatively, the regional routing module 230 may receive the candidate hubs 231 as a separate data source independent of the candidate regions 224. The controller 220 may filter the candidate hubs 231 according to the one or more user requirements, for example the one or more hub requirements.

The distance calculator 226 may receive the candidate hubs 231 and determine hub travel costs from each of the candidate hubs 231 to one or more candidate regions 224 adjacent to, or containing, the candidate hub 231. In some examples, the controller 220 may receive the hub travel costs as hub data associated with the candidate hubs.

The regional routing module 230 may receive the candidate regions 224, regional values, regional travel costs, candidate hubs and hub travel costs. The regional routing module 230 can then select the plurality of intermediate regions from the plurality of candidate regions 224 and select a plurality of intermediate hubs from the plurality of candidate hubs, to define the regional route. The regional route may comprise a selected plurality of intermediate hubs with one or more intermediate regions between each successive intermediate hub. Including intermediate hubs advantageously enables the system to provide multi-segment journeys, for example multi-day journeys in which the travelling entity may rest between segments. The regional routing module 230 may perform the selection using the optimization algorithm and the associated objective function may operate on the hub travel costs.

In some examples, such as those using a genetic algorithm, the regional routing module 230 may use a blueprint defining a structure of the regional route. In some examples, the controller 220 may receive the blueprint, for example from the user input 222. In other examples, the controller 220 may generate the blueprint based on the user input 222. The blueprint of the regional route may take the form {start location, N×[hub, one or more regions], end location}, where N is the number of journey segments. In some examples, the user input 222 may include a number of intermediate regions, R, to be visited in each journey segment. In other examples, the number of intermediate regions, R, to be visited in each journey segment may be allowed to vary and depend on the travel cost of visiting selected intermediate regions. In such examples, the total number of intermediate regions in the blueprint may be fixed to provide a fixed length blueprint. Providing a fixed length blueprint can enable more efficient and accurate processing, including the use of a genetic algorithm.

The genetic algorithm may solve a two-fold condition defined by the fitness function. On the one hand, the genetic algorithm may attempt to maximise a cumulative regional value of the trip by selecting intermediate regions with high regional values. On the other hand, the genetic algorithm may attempt to minimize the total travel cost of the regional route by selecting regions (and optionally hubs) that do not deviate far from a path between the start point to the end point. The two-fold condition may be referred to as a multi-objective optimization problem. The regional routing module 230 may perform the optimization and output a set of viable solutions optimizing both objectives. Each solution can comprise an intermediate region route that follows the blueprint and is the best of its kind either by minimizing the total travel cost, maximizing the total regional value or a mix of both. The regional route solutions can enable the controller 220 to exclude any candidate region 224 that is not part of a viable solution from the local routing (segment routing) step discussed below.

With a start location, A1, an end location, A2, a set of candidate regions $\{r\_1, r\_2, \ldots, r\_n\}$, a set of hubs $\{h\_1, h\_2, \ldots h\_m\}$ and two intermediate regions per journey segment (R=2), an example regional route solution following the above general blueprint may be of the form:

$$[A1, h\_4, r\_2, r\_3, r\_4, r\_5, r\_1, \ldots, h\_9, A2]$$

Such a regional route can be input to the local routing algorithm. It will be appreciated that in some examples, the start location and the end location may be the same. Furthermore, in some examples, the start location and/or end location may comprise a hub, for example, in the above solution the start location, A1, may be the first hub, h_4.

Local Routing

The controller 220 may comprise a local routing module 232 configured to perform a local routing algorithm. The controller 220 or regional routing module 230 may provide one or more regional route solutions as input to the local routing module 232. The local routing module 232 may perform the local routing algorithm using the one or more regional route solutions, i.e. the selected intermediate regions. In particular, the local routing algorithm may select POIs from the selected intermediate regions of a regional route solution as intermediate POIs of the travel itinerary.

In this example, the local routing module 232 receives the candidate POIs (and associated POI data 223) within each selected intermediate region as data associated with the regional route solution. In other words, the POI data 223 associated with he selected intermediate regions is propagated from the candidate regions to the local routing module 232. In other examples, the local routing module 232 may select the POI data 223 from the library 225 based on the selected intermediate regions of the regional route solution.

The POI data 223 may include the POIs within each intermediate region, and their associated co-ordinates. The local routing module 232 may determine POI travel costs associated with each POI. The local routing module 232 may utilise the distance calculator 226 to determine the POI travel costs. In other examples, the POI data 223 may include pre-calculated POI travel costs, at least within each candidate region. The POI data may include POI values as described above.

The local routing algorithm may comprise any optimization algorithm. In this example, the local routing algorithm comprises an ant colony optimization algorithm (ACO). The optimization algorithm may include a POI objective function that operates on a POI value and POI travel costs associated with each candidate POI. The POI travel costs for each candidate POI may comprise travel costs associated with travelling to (or from) the POI, respectively from (or to): (i) one or more other candidate POIs; (ii) the start location or the end location; and/or (iii) one or more candidate hubs.

In some examples, the POI costs of each candidate POI may further comprise an intra-POI travel cost. The intra-POI travel cost may relate to a POI interaction time required for the travelling entity to complete a corresponding interaction (e.g. item collection, visit POI, etc) at the candidate POI.

The local routing algorithm 232 may adjust a selection of the intermediate POIs from the POIs of the selected intermediate regions until a value of the POI objective function satisfies a termination condition. The termination condition may comprise a value of the POI objective function satisfying one or more thresholds or any other known termination condition.

In examples in which the journey has been divided into journey segments, the local routing module 232 may perform the optimisation algorithm on each journey segment individually. Optimising each journey segment individually advantageously allows parallel computation resulting in a faster process. For each journey segment, the local routing algorithm may adjust a selection of the intermediate POIs from POIs of selected intermediate regions of the journey segment until a value of a segment objective function, operating on the POI value and the POI travel costs, satisfies a termination condition. The segment objective function may be similar to the POI objective function. However, constraints applied to the segment objective function will relate to the journey segment, for example the POI travel costs may be assessed against segment cost thresholds rather than journey cost thresholds (for the POI objective function). For example, the segment cost thresholds may relate to the segment size, for example a day of travel time or a distance threshold relating to fuel capacity. The journey thresholds may relate to the fixed duration of the journey.

As described above, the regional route solution may provide journey segment solutions of the form: {first hub, one or more intermediate regions, second hub}. Therefore, the local routing algorithm may construct a directed graph for each journey segment, the directed graph including:

The first hub of the segment

All candidate POIs for the one or more intermediate regions of the segment

The second hub of the segment

In this way, the local routing algorithm can perform the optimization algorithm for each journey segment independently. For example, the local routing algorithm may perform ACO on each journey segment using the corresponding directed graph.

The POI objective function or segment objective function may operate on a cumulative POI value for selected intermediate POIs of the selected intermediate regions. The local routing algorithm may attempt to maximise the cumulative POI value by adjusting the selected intermediate POIs.

In some examples, the local routing algorithm may mark a POI as visited if selected as an intermediate POI. In this way, the local routing algorithm can avoid re-selecting POIs that have previously been selected for regional routes that include more than one instance of the same intermediate region (same intermediate region re-visited).

The POI objective function or segment objective function may operate on the POI travel costs of selected intermediate POIs of the selected intermediate regions. In some examples, the local routing algorithm may attempt to minimise a cumulative POI travel cost for the journey or segment. In some examples, the POI/segment objective function may use the cumulative travel cost as a binary constraint. For example, the local routing algorithm may constrain the cumulative travel cost to not exceed a journey/segment cost threshold (with all values of cumulative travel cost less than the threshold treated equally). The journey/segment cost thresholds may be set according to journey segment duration and/or travelling entity capacity, which may be included in the one or more user requirements of the user input 222. Implementing the cumulative travel cost as a binary constraint can advantageously enable a focus on maximising cumulative POI value.

The local routing module 232 may perform the local routing algorithm and output the travel itinerary. The travel itinerary may comprise a POI-level routing plan with co-ordinates of the intermediate POIs (and optionally intermediate hubs) as waypoints between the start location and the end location. For segmented journeys, the local routing module may output the travel itinerary as a plurality of POI-level routing plans, each POI-level routing plan corresponding to each journey segment. Each journey segment may comprise the plurality of intermediate POIs (and associated co-ordinates) between a pair of intermediate hubs. The local routing module 232 may output the travel itinerary to a display unit of a user interface 234. The user interface may comprise a display screen of a user device such as a personal computer, smartphone, tablet or other network-enabled device. The user device may be separate to, and in network communication, with the controller 220.

In some examples, the controller 220 may receive user feedback on the one or more selected intermediate POIs of the travel itinerary. For example, the user may opt to delete a selected intermediate POI from the travel itinerary and/or replace a selected intermediate POI with a different candidate POI. The controller 220 may update the POI values of the deleted, replaced or replacement POIs based on the user feedback.

Figure 3:
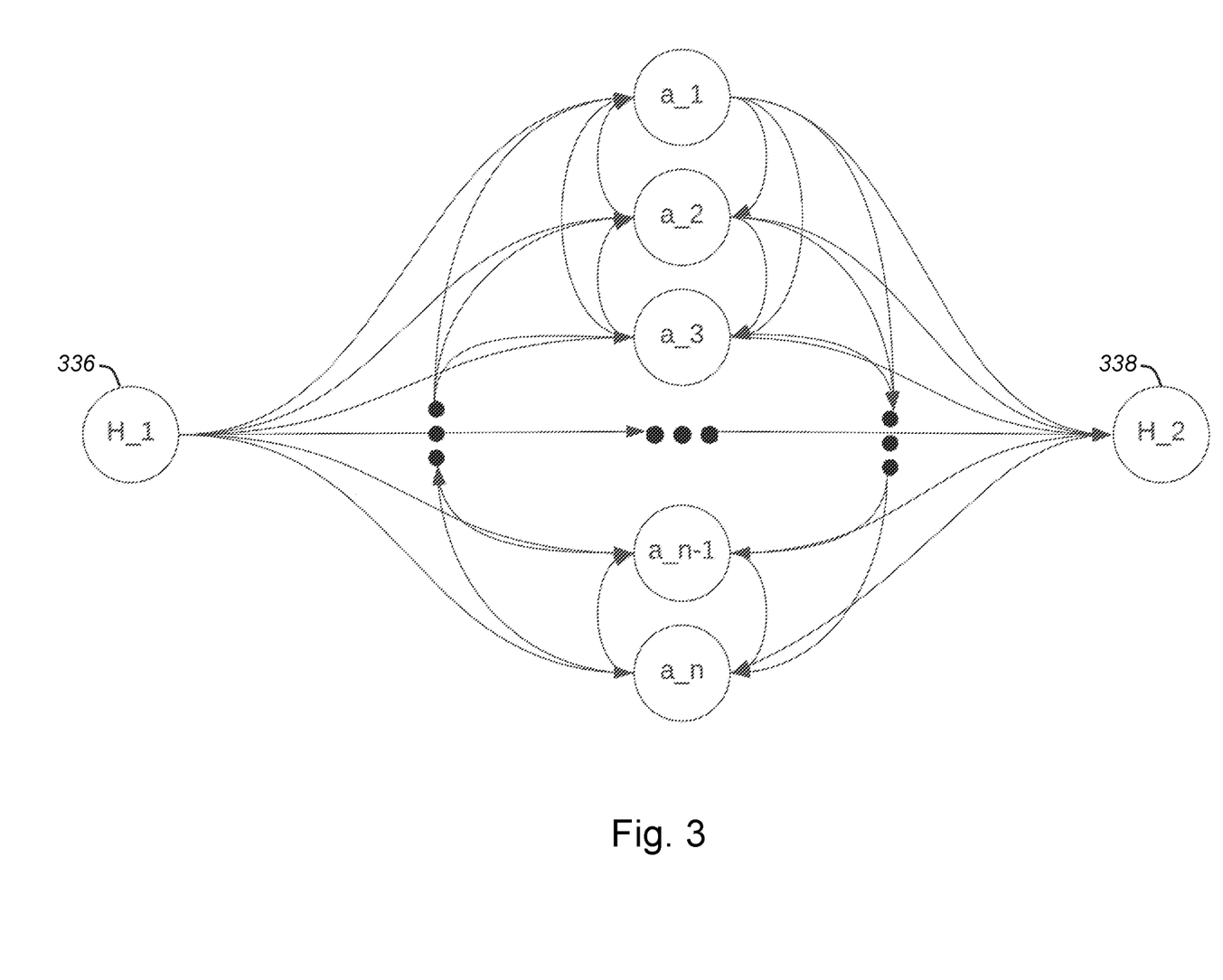
FIG. 3 illustrates an example directed graph for a single journey segment.

FIG. 3 illustrates an example directed graph for a single journey segment. The directed graph is illustrated with a first hub, Hi, 336 and a second hub, $H_2$, 338 at either end of the segment. The plurality of candidate POIs a_1 . . . a_n, corresponding to the candidate POIs of the selected intermediate regions of the route solution, are arranged between the first hub 336 and the second hub 338. The first hub 336 is connected to each candidate POI by a directed connection. Each candidate POI is connected to every other candidate POI. Each candidate POI is connected to the second hub 338 by a directed connection.

As the algorithm progresses, artificial ants can travel to the highest value candidate POIs until the cumulative travel cost (time spent travelling between POIs and interaction time spent at POIs) reaches the segment cost threshold. Once the threshold is reached, or once the cumulative travel cost is within a certain value of the threshold, the artificial ant will complete the segment by travelling to the second hub 338.

The local routing module may perform ACO on the directed graph to determine a local routing solution for the journey segment. Each candidate POI will have an associated POI value as discussed above and the artificial ants of the ACO will attempt to maximise the cumulative POI value. In some examples, the segment cost threshold sets a limit on the total travel cost. Therefore, the artificial ants can account for travel cost by monitoring how much travel time or distance has elapsed through each run. Therefore, when an ant needs to decide the next candidate POI to visit, the local routing module may take into account:

The travel cost to reach the candidate POI;
How close a current cumulative travel cost is to the segment cost threshold/Is it feasible to visit another candidate POI before going to the second hub; and/or
The interaction time of the POI—how long does it take to visit the candidate POI?

By analysing these factors on each run (each list), the ACO can ensure that each solution does not exceed the segment cost threshold.

Regional Segmentation

Returning to FIG. 2, as mentioned earlier, in some examples the controller 220 may receive raw geographical data instead of predefined candidate regions 224. The controller 220 may determine the candidate regions 224 by segmenting the raw geographical data. The raw geographical data may include the candidate POIs. The raw geographical data may relate to a working area encompassing all candidate POIs and the start and end-locations, for example a country or an operational area. In some examples, the controller 220 may set the extent of the working area based on the start location, the end location and/or the fixed duration (which may define the extent of deviation the travelling entity may take from the path between the start and end locations). In other examples, the library 225 may contain data related to pre-defined working areas—countries or operational areas. In some examples, the controller 220 may obtain the raw geographical data from an opensource navigation resource such as OpenStreetMap.

The controller 220 may perform regional segmentation by grouping together POIs that share geographical boundaries to form a plurality of candidate regions 224. The raw geographical data may include information about: country and region boundaries; regions that are subregions of other regions; and regions that are boundaries of a city.

The controller may apply any segmentation approach for segmenting the POIs of the raw geographical data into candidate regions. Two example segmentation approaches include:

1. Flat Segmentation—Based on an importance rating of regions within the working area and satisfying a set of constraints; or
2. Hierarchical Tree—Traversal segmentation with constraints In some examples, the controller 220 may apply flat segmentation to identify regions which are suitable locations for candidate hubs 231. In some examples, the controller 220 may apply hierarchical tree segmentation to segment candidate POIs to define the plurality of candidate regions 224.

1. Flat Segmentation

In flat segmentation, the controller 220 can order all regions cities, villages, and towns within the working area according to an importance metric. The importance metric may relate to a priority of the region. In some examples, the importance metric may be based on a priority of POIs within the region (e.g. a delivery date or a threat level).

In some examples, the importance metric may be based on a populous or popularity of the region. In some examples, the importance metric may be based on a page rank of the respective region in the opensource navigation resource.

The controller 220 may apply additional constraints for defining the candidate regions 224 including:

- Each candidate region 224 has at least a threshold number of POIs;
- A granularity (country, municipality, city, town, or neighbourhood) of the candidate region 224 is within a desired range;
- A candidate region does not contain a more important candidate region; and/or
- A candidate region is not within a more important candidate region.

In some examples, the controller 220 may select an integer number of regions with the highest importance metrics as the plurality of candidate regions. Each candidate region 224 includes a plurality of candidate POIs. As mentioned above, the controller 220 may implement flat segmentation to identify a plurality of regions that are suitable locations for candidate hubs and it will be appreciated that the candidate POIs described here in relation to flat segmentation may relate to candidate hubs 231. The controller 220 may include an upper bound on the number of candidate POIs/candidate hubs in each candidate region.

2. Hierarchical Segmentation

In hierarchical segmentation, the controller 220 may structure geographical boundaries within a working area (e.g. country, operational area) in a hierarchical tree structure with the boundary of the entire working area as the root. The controller 220 may define the plurality of candidate regions 224 based on two cut-off values:

- A first cut-off value may define a minimum number of POIs that each candidate region must include. The first cut-off value may be defined as a percentage of the total number of POIs in the working area; and
- A second cut-off value may define a maximum depth of traversal into the hierarchical tree (how granular boundaries can be to be considered a region).

The controller 220 may start analysing the hierarchical tree structure at the root and work through the hierarchical levels until either the first cut-off value or second cut-off value is breached.

- If the controller 220 reaches a level at which a current boundary has fewer POIs than the first cut-off value, then the immediate parent B (one level higher) is defined as a candidate region. The parent B then includes the POIs from A as its own. The controller continues the tree traversal by checking A's siblings and moving back up the tree again as appropriate.
- If the controller 220 reaches a depth equal to the second cut-off value, then all of the child levels are too granular and the current boundary is marked as a candidate region.

Figure 4:
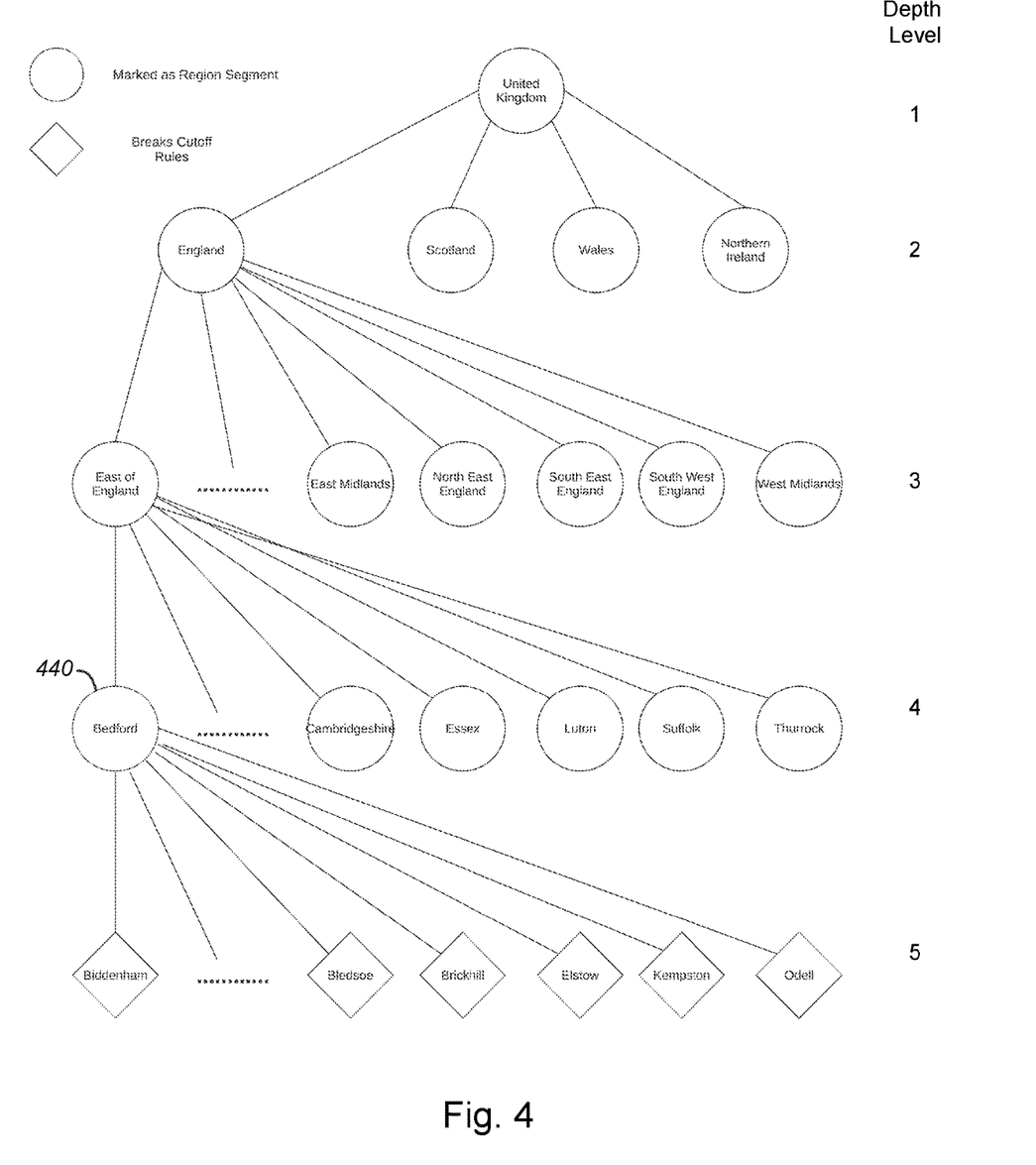
FIG. 4 illustrates a hierarchical tree structure for regional segmentation.

FIG. 4 illustrates a hierarchical tree structure for regional segmentation. In this example, the working area is the United Kingdom. The second cut-off value is 4. Therefore, when the controller reaches depth level 4 and the first analysed region 440 "Bedford" has more POIs than the first cut-off value, then the first analysed region 440 is defined as a candidate region because the child regions at depth level 5 would exceed the second cut-off value.

The regional segmentation process advantageously groups together POIs that share a boundary to define non-overlapping candidate regions.

Figure 5:
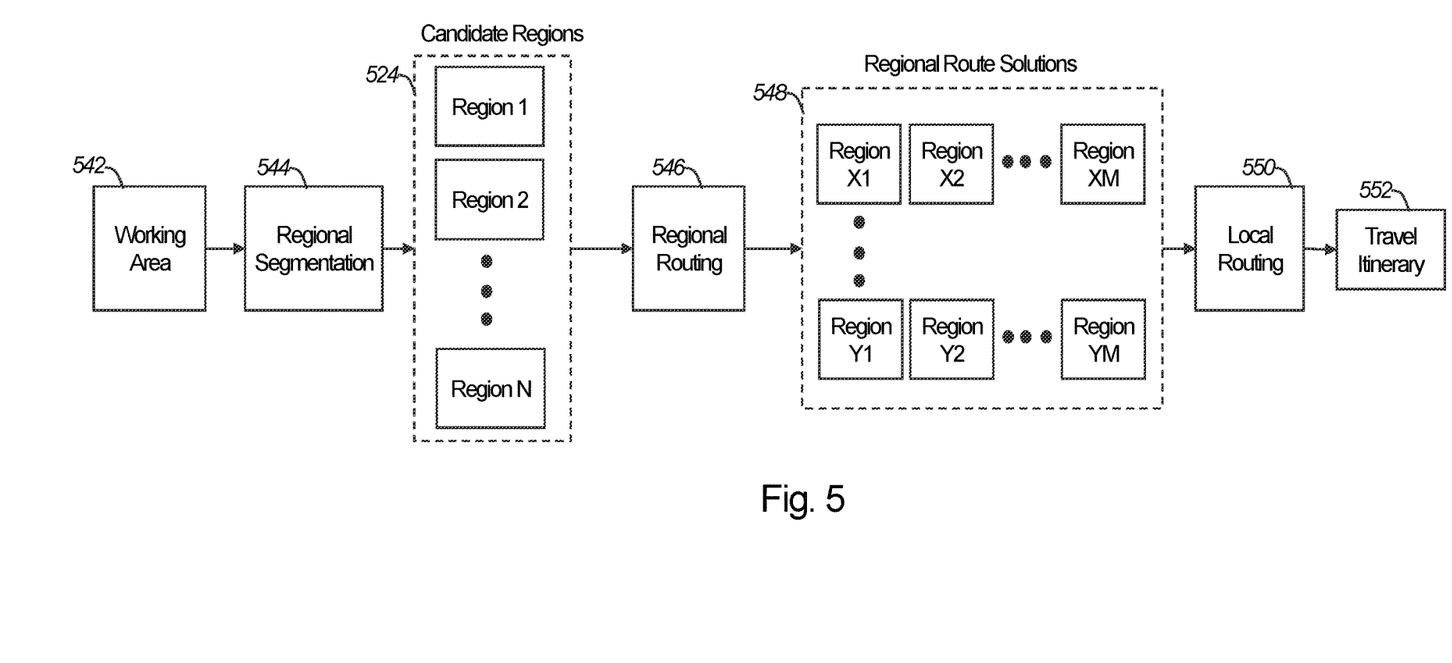
FIG. 5 illustrates a workflow including processes of regional segmentation, regional routing and local routing according to an embodiment of the present disclosure.

FIG. 5 illustrates a workflow including the above-described processes of regional segmentation, regional routing and local routing according to an embodiment of the present disclosure.

The controller may select or define raw geographical data corresponding to a working area 542. The controller may select or define the working area 542 based on the start location, the end location and/or the fixed duration. The working area 542 may include many hundreds, thousands, tens of thousands or hundreds of thousands of candidate POIs. As a result, a brute force optimization of the candidate POIs to define the travel itinerary would require a long time and/or huge computational resources.

The controller may perform regional segmentation 544 to segment the POIs of the working area into a plurality of candidate regions 524. The density-based grouping provided by the regional segmentation 544 can allow the controller to utilize a metaheuristic approach to determining the travel itinerary.

As described above, the controller may perform regional routing 546 to determine one or more regional route solutions 548. The controller may select a plurality of intermediate regions from the plurality of candidate regions 524 to define the one or more regional route solutions 548 based on a regional value and regional travel costs associated with each candidate region 524.

A regional route solution comprises an ordered sequence of intermediate regions (Region X1... region XM), where {Region X1 . . . Region XM}⊆{Region 1 . . . Region N}. The regional route solution may also include intermediate hubs (not shown) and be defined according to a predefined structure, as described above.

The controller may rank the one or more regional route solutions 548 according to a corresponding value of the objective function.

The controller may perform local routing 550 on one or more of the regional route solutions 548 to determine and output the travel itinerary 552, as described above. As also described above, the controller may segment the journey into a plurality of segments and perform local routing on each of the segments independently.

In some examples, the controller may only perform local routing 550 on the highest ranked regional route solution. In other examples, the controller may perform local routing 550 on an integer number of highest ranked regional route solutions. The controller may then determine and output the travel itinerary as the local POI level route with the best (lowest or highest depending on implementation) POI objective function value (or cumulative segment objective function value).

Application Examples

Three example applications are described here that can make use of the disclosed systems and methods for determining a travel itinerary. It will be appreciated that the disclosed systems and methods may be applied to other applications.

Logistics Planning for a Delivery Driver

In this example, the travelling entity may be a delivery driver and associated vehicle. For example, the travelling entity may include a freelance delivery driver who can provide delivery and collection services to a third party with a large number of items requiring pickup and delivery, the locations of which define candidate POIs. The disclosed systems and methods may provide a prioritised, highest value itinerary for the freelance delivery driver.

The POI value may relate to a priority of the item, an expected delivery or collection date of the item, a time-waiting value or any other parameter related to the urgency of collection or delivery of the item.

The driver may input a start location and end location (for example, both may relate to the driver's home address) and a duration during which they wish to offer their service.

The driver may also input one or more user requirements. For example, the travelling entity requirements may include a travelling entity capacity such as a vehicle load and/or a vehicle fuel range (e.g. electric or hydrocarbon range). The one or more hub requirements may relate to required facilities at the hub e.g. refuelling capability, sustenance and/or overnight accommodation for the vehicle driver etc.

The controller may receive the driver inputs and divide the journey into a plurality of journey segments. For example, the controller may divide the journey into a plurality of segments based on the vehicle fuel range. The controller may define a structure for the journey such that the regional route plan includes intermediate hubs for refuelling.

The controller may then perform regional routing to provide a regional route solution and perform local routing on the regional route solution to define the travel itinerary for the delivery driver. The travel itinerary may include a list of POIs, defining locations at which items are to be collected or delivered, interspersed with intermediate hubs for refuelling.

The disclosed systems and methods may be applied in a similar way for HGV drivers on long haul journeys and by corporate entities planning routes for multiple vehicles.

Travel Planning

In this example, the travelling entity may be one or more persons planning a trip away from home who require a travel itinerary at short notice. The disclosed systems and methods can again efficiently provide an itemised itinerary by processing a large number of candidate POIs that would require a long time or significant computational resources to assess by conventional means. The POIs may relate to attractions and sustenance locations. The hubs may relate to accommodation.

The POI value may relate to a rating of the attraction and/or a number of ratings of the attraction. In some examples, the regional value may be calculated as:

$$\sum_{i \in A} \text{ratings}_i * \text{num. reviews}_i$$

where the regional value is equal to the sum over all POIs (i) of the rating of the POI multiplied by the number of reviews of the POI.

A traveller may input a start location and end location (for example, an arrival airport and a departure airport in a destination country) and a duration of their trip.

The traveller may also input one or more user requirements. For example, the travelling entity requirements may include a travelling entity size (i.e. number of persons travelling), travelling entity demographics and travelling entity capacity such as the distance or time the travelling entity can travel each day and/or how many POIs the travelling entity can visit each day. The one or more POI rules may include a selection of POI types (e.g. attraction type, food preferences etc). The one or more hub requirements may include accommodation type, cost, amenities etc.

The controller may receive the traveller inputs and divide the journey into a plurality of journey segments. For example, the controller may divide the journey into a plurality of segments each corresponding to one day of the journey. The controller may define a structure for the journey such that the regional route plan includes intermediate hubs for accommodation each night. The controller may filter out POIs that do not comply with the one or more user requirements and/or adjust POI values based on how they align with the one or more user requirements. An example blueprint for a regional routing genetic algorithm, with R=2, may take the form:

[A1, Hotel, Region, Region, Hotel, Region, Region . . . Hotel, A2]

The controller may then perform regional routing to provide a regional route solution and perform local routing on the regional route solution to define the travel itinerary for the travelling entity. The travel itinerary may include a list of POIs, defining attractions, restaurants and the like, interspersed with intermediate accommodation hubs.

Disaster Response Planning

In an emergency, for example, following sudden flash flooding, the capacity of emergency response vehicles may be far exceeded by the number of persons requiring rescue. These persons may be recorded as POIs and the disclosed systems and methods may provide a prioritised travel itinerary for an emergency vehicle (travelling entity) to respond to persons most in need.

The POI value may relate to any of: demographics of the persons requiring rescue; a health condition of the persons requiring rescue; a waiting time of the persons requiring rescue; a future threat level to the persons requiring rescue; or any other metric quantifying an urgency of rescuing persons at the POI.

An operational controller (user) may input a start location and end location (for example, both may relate to a home base of the vehicle) and a duration of their trip (for example, the safe flying time of the pilot of an emergency helicopter).

The operational controller may also input one or more user requirements. For example, the travelling entity requirements may include a travelling entity capacity such as a passenger load or a vehicle range. The one or more POI rules may include rules based on a minimum threat level, health condition, time waiting and/or demographics of persons located at the POI. The one or more hub requirements may relate to required facilities at the hub, for example, refuelling capability, emergency treatment capability etc.

The controller may receive the operational controller inputs and divide the journey into a plurality of journey segments. For example, the controller may divide the journey into a plurality of segments based on the vehicle fuel range. The controller may define a structure for the journey such that the regional route plan includes intermediate hubs for refuelling.

The controller may then perform regional routing to provide a regional route solution and perform local routing on the regional route solution to define the travel itinerary for the emergency vehicle. The travel itinerary may include a list of POIs, defining persons in need and/or healthcare facilities, interspersed with intermediate refuelling hubs.

The disclosed systems and methods can advantageously process an enormous number of different POIs to route a user from a starting location to an end location and, on the way, interact with different POIs that optimize a value of the journey.

The disclosed systems and methods address a combination of the Traveling Salesman Problem, Knapsack Problem and an Orienteering Problem, all proven to be NP-hard (unsolvable in polynomial time). By extension, therefore, the disclosed systems and methods solve an NP-hard problem. The disclosed systems and methods provide a reasonable solution in a reasonable time which can provide a solution for travel through a large working area with thousands of candidate POIs.

The disclosed systems and methods can split the problem into multiple steps, and in each step, the method provides different simplifications of the problem. In other words, the systems and methods can solve a simplified version of the problem to exclude parts of the search space that include infeasible solutions. The simplicity may be reduced at each step, excluding more and more of the search space until local routing operates on a search space with real-world complexity and provides a solution in a reasonable time.

It will be appreciated that any reference to "close to", "before", "shortly before", "after" "shortly after", "higher than", or "lower than", etc, can refer to the parameter in question being less than or greater than a threshold value, or between two threshold values, depending upon the context.

The invention claimed is:

1. A computer implemented method of determining a travel itinerary comprising:
   receiving, from a user input:
      a start location;
      an end location;
      a start time for starting a journey from the start location; and
      an end time for ending the journey at the end location, a difference between the start time and the end time defining a fixed duration;
   selecting, using one or more processors, a plurality of intermediate points of interest, POIs, as a subset of a plurality of candidate POIs to define the travel itinerary between the start location and the end location, wherein selecting the plurality of intermediate POIs comprises:
      selecting, using the one or more processors, a plurality of intermediate regions from a plurality of candidate regions, each candidate region comprising a regional subset of the plurality of candidate POIs, to define a regional route from the start location to the end location, based on the fixed duration, a regional value associated with each candidate region and regional travel costs associated with each candidate region; and
      selecting, using the one or more processors, the plurality of intermediate POIs based on the selection of intermediate regions, a POI value associated with each candidate POI within the selection of intermediate regions and POI travel costs associated with each POI; and
   outputting, to a user interface, the travel itinerary as an ordered route from the start location to the end location via the plurality of intermediate POIs,
   wherein the method further comprises determining, using the one or more processors, a plurality of journey segments based on the fixed duration, and wherein selecting the plurality of intermediate POIs comprises parallel computation of the journey segments.

2. The computer implemented method of claim 1, further comprising:
   receiving, from a library, a plurality of candidate hubs; and
   selecting, using the one or more processors, a plurality of intermediate regions from a plurality of candidate regions and selecting a plurality of intermediate hubs from the plurality of candidate hubs to define the regional route, based on the fixed duration, the regional value associated with each candidate region, the regional travel costs associated with each candidate region and hub travel costs associated with each candidate hub.

3. The computer implemented method of claim 2, wherein the regional route comprises the plurality of intermediate hubs with one or more regions between successive intermediate hubs.

4. The computer implemented method of claim 2, further comprising:
   defining, using the one or more processors, a template structure of the regional route to include:
      an intermediate hub between each journey segment; and
      one or more intermediate regions within each journey segment.

5. The computer implemented method of claim 2, wherein selecting the plurality of intermediate regions from the plurality of candidate regions and selecting a plurality of intermediate hubs from the plurality of candidate hubs comprises:
   adjusting, using the one or more processors, a selection of the plurality of intermediate regions and adjusting a selection of the plurality of the intermediate hubs until a value of a regional objective function, operating on the regional value, the regional travel costs and the hub travel costs, satisfies a termination condition.

6. The computer implemented method of claim 5, wherein adjusting, using the one or more processors, the selection of the plurality of intermediate regions is performed by a genetic algorithm and the regional objective function is a fitness function.

7. The computer implemented method of claim 1, wherein selecting the plurality of intermediate regions from the plurality of candidate regions comprises:
   adjusting, using the one or more processors, a selection of the plurality of intermediate regions until a value of a regional objective function, operating on the regional value and the regional travel costs, satisfies a termination condition.

8. The computer implemented method of claim 7, wherein adjusting, using the one or more processors, the selection of the plurality of intermediate regions is performed by a genetic algorithm and the regional objective function is a fitness function.

9. The computer implemented method of claim 1, wherein selecting the plurality of intermediate POIs comprises:
   adjusting, using the one or more processors, a selection of the intermediate POIs from POIs of the selected intermediate regions until a value of a POI objective function, operating on the POI value and the POI travel costs, satisfies a termination condition.

10. The computer implemented method of claim 9, wherein adjusting, using the one or more processors, the selection of the intermediate POIs is performed by an ant colony optimization algorithm.

11. The computer implemented method of claim 9, wherein adjusting, using the one or more processors, the selection of the intermediate POIs is performed by an optimization algorithm.

12. The computer implemented method of claim 1, wherein selecting the plurality of intermediate POIs comprises, for each journey segment:
   adjusting, using the one or more processors, a selection of the intermediate POIs from POIs of selected intermediate regions of the journey segment until a value of a segment objective function, operating on the POI value and the POI travel costs, satisfies a termination condition.

13. The computer implemented method of claim 12, wherein adjusting, using the one or more processors, the selection of the intermediate POIs is performed by an ant colony optimization algorithm.

14. The computer implemented method of claim 12, wherein adjusting, using the one or more processors, the selection of the intermediate POIs is performed by an optimization algorithm.

15. The computer implemented method of claim 1, wherein the regional value associated with each candidate region is based on POI values of candidate POIs in the candidate region.

16. The computer implemented method of claim 1, further comprising:
   receiving, from the user input, user feedback on the one or more selected intermediate POIs of the travel itinerary; and
   updating, using the one or more processors, the POI values of the one or more selected intermediate POIs based on the user feedback.

17. The computer implemented method of claim 1, further comprising:
   receiving, selecting or determining, using the one or more processors, the plurality of candidate POIs based on the start location, the end location and/or the fixed duration.

18. A non-transitory computer readable medium comprising computer code configured to perform the method of claim 1.

19. An apparatus for determining a travel itinerary, the apparatus comprising:
   at least one processor; and
   at least one memory including computer program code, the at least one memory and computer program code configured to, with the at least one processor, cause the apparatus to:
      receive:
         a start location;
         an end location;
         a start time for starting a journey from the start location; and
         an end time for ending the journey at the end location, a difference between the start time and the end time defining a fixed duration;
      select a plurality of intermediate points of interest, POIs, as a subset of a plurality of candidate POIs to define the travel itinerary between the start location and the end location, wherein selecting the plurality of intermediate POIs comprises:
         selecting a plurality of intermediate regions from a plurality of candidate regions, each candidate region comprising a regional subset of the plurality of candidate POIs, to define a regional route from the start location to the end location, based on the fixed duration, a regional value associated with each candidate region and regional travel costs associated with each candidate region; and
         selecting the plurality of intermediate POIs based on the selection of intermediate regions, a POI value associated with each candidate POI within the selection of intermediate regions and POI travel costs associated with each POI; and
      output the travel itinerary as an ordered route from the start location to the end location via the plurality of intermediate POIs,
      wherein the at least one memory and computer program code are configured to, with the at least one processor, cause the apparatus to determine a plurality of journey segments based on the fixed duration, and wherein selecting the plurality of intermediate POIs comprises parallel computation of the journey segments.

\* \* \* \* \*